(12) United States Patent
Álvarez Granda (10) Patent No.: US 11,844,355 B2
(45) Date of Patent: Dec. 19, 2023

(54) ELEMENT OPENING AND CLOSING MACHINE

(71) Applicant: COMPAÑÍA DE GALLETAS NOEL S.A.S., Medellín (CO)

(72) Inventor: Elkín de Jesús Álvarez Granda, Medellín (CO)

(73) Assignee: Compañia de Galletas Noel S.A.S., Medellín (CO)

( * ) Notice: Subject to any disclaimer, the term of this patent is extended or adjusted under 35 U.S.C. 154(b) by 44 days.

(21) Appl. No.: 17/388,153

(22) Filed: Jul. 29, 2021

(65) Prior Publication Data
US 2022/0030884 A1    Feb. 3, 2022

(30) Foreign Application Priority Data
Jul. 31, 2020   (CO) .................... NC2020/0009604

(51) Int. Cl.
*A21C 3/02* (2006.01)
(52) U.S. Cl.
CPC .................................. *A21C 3/025* (2013.01)
(58) Field of Classification Search
CPC ................................................. A21C 3/02–027

USPC .......................................................... 425/335
See application file for complete search history.

(56) References Cited

U.S. PATENT DOCUMENTS

| | | | | |
|---|---|---|---|---|
| 5,498,433 A * | 3/1996 | Ouellette | ................. | A21C 3/02 264/153 |
| 5,811,137 A * | 9/1998 | Clark | ....................... | A21C 3/02 100/168 |
| 2003/0066332 A1* | 4/2003 | Teraoka | .................... | B21J 9/18 72/441 |
| 2019/0343131 A1* | 11/2019 | McCarty, Jr. | .......... | A21C 3/024 |

* cited by examiner

*Primary Examiner* — Francisco W Tschen
*Assistant Examiner* — Edgaredmanuel Troche
(74) *Attorney, Agent, or Firm* — The Morales Law Firm; Joseph L. Morales, Esq.

(57) ABSTRACT

A machine opening and closing element for processing raw material having a first element and a second element through which the processed raw material passes, wherein the first element is connected to a mechanism which is connected to a power shaft, said first mechanism being in charge of generating a motion of the first element towards the second element. In particular, the machine for opening and closing element has a coupling arranged in a perforation of a support, such that the coupling may rotate in the perforation.

20 Claims, 7 Drawing Sheets

ELEMENT OPENING AND CLOSING MACHINE

FIELD OF THE INVENTION

This invention relates to an opening and closing machine for elements of the type comprising a fixed element and a mobile element for the processing of raw material, through which said raw material passes for processing. In particular, this invention relates to a roller sheeter, with a fixed roller and a mobile roller, for laminating a raw material (e.g., cookie dough).

BACKGROUND OF THE INVENTION

In the industry related to the processing of raw materials by grinding or crushing of raw material, in the form of seed or grain, such as cereals, food doughs and the like, machines are known for grinding, laminating or crushing such raw material, where such machines are responsible for transforming the raw material either to a powder or rolled into cookie dough.

Within these machines, there are the so-called roller sheeters, which are mainly composed of a fixed roller and a mobile roller, which allows changing the distance between them, and between which a raw material passes to perform the laminating thereof.

On the other hand, there are known mechanisms in the industry to move the mobile roller with respect to the fixed roller. There are several types of mechanisms to fulfill this function such as pneumatic mechanisms, hydraulic mechanisms and mechanical mechanisms. Regardless of the type, these mechanisms are exposed to different types of loads during operation, e.g., due to foreign elements in the middle of the rollers that may have a hardness greater than that of the raw material being processed. These loads generate stresses in the rollers as such and in the mechanisms that are in charge of transmitting motion to the roller. Therefore, failures occur in these elements.

Considering the foregoing, there is a need to find element opening and closing machines that include mechanisms to avoid failures, due to the presence of reaction loads and also to avoid damaging their operation, which may cause stoppages in the processing of raw materials.

On the other hand, in the prior art, documents related to element opening and closing machines for the processing of feedstock with mechanisms that prevent failures due to the presence of reaction loads are identified, e.g., U.S. Pat. No. 5,816,511A and GB2171332A.

Document U.S. Pat. No. 5,816,511A discloses a machine for grinding cereals and similar products comprising at least a pair of cylinders rotating about their respective rotation axes, one of which is fixed and one mobile in motion with respect to the other. Each end of the mobile cylinder is connected to a support member which are arranged in a frame, the opposite ends of the support being respectively pivotally mounted on a device for adjusting the interaxial distance of the cylinders, acting about a single fixed rotation axis, and on a device for absorbing reaction forces of the grinding operation, to which an upper part of a member supporting the fixed cylinder is also connected.

Furthermore, U.S. Pat. No. 5,816,511A discloses that the mobile cylinder is connected through a cam arranged transversely with respect to the support member itself, to the device for controlling and performing positioning of the mobile cylinder itself (3). Particularly, U.S. Pat. No. 5,816,511A discloses that the cam is connected to the device, through a tang of a clevis piece, the clevis piece being connected to the free end of an arm, which is a worm gear that may be made to rotate in any direction by means of a gear motor. The entire gear motor and arm assembly is hinged at a point on the frame by means of a pivot to perform the pivoting action with respect to the frame.

On the other hand, GB2171332A discloses a grinding machine of the type comprising a pair of heavy rollers defining a notch through which material, such as powdered clay, is passed. One of the rollers may be moved toward and away from the other roller to prevent damage to the machine should a non-crushable foreign body pass between the rollers. The control to keep the roller away is provided by a fast-acting torque limiting mechanism comprising a pair of links between which the torque limiting device is connected. Additionally, GB2171332A provides a means for establishing roller spacing between the rollers by linking the rollers together and then moving them backward from the zero position.

In particular, the torque limiting mechanism of GB2171332 comprises an overload alternating device in the form of two links, pivotally connected around a shaft, the links being coupled by a torque limiting coupling. In case of overload, the links pivot around the shaft avoiding damage to the machine.

However, GB2171332 discloses that the overload alternating device in the form of two links stops the power transmission when an overload occurs in the cylinders, which causes the whole process to stop generating delays.

Therefore, the cited documents disclose different element opening and closing machines for processing raw material. However, said machines do not disclose ways to prevent the motion transmission elements from remaining stationary in their operation, without elements having stress concentrations and not stopping when there is an overload of stress on the elements for processing raw material.

BRIEF DESCRIPTION OF THE INVENTION

This invention corresponds to an element opening and closing machine having a first element; a second element facing the first element; a first support with a first perforation; a power shaft; a first mechanism formed by: a shaft with a first end and a second opposite end; a transmission mechanism connected to the power shaft and to the first end of the shaft; wherein, the transmission mechanism allows transforming the rotation of the power shaft into linear motion that is transmitted to the shaft and a rod connected to the second opposite end of the shaft and to the first element, wherein the rod transmits motion to the first element. Specifically, the element opening and closing machine comprises: a first coupling with a first end, a second end and a through hole, the first coupling being arranged concentrically in the first perforation of the first support; wherein, the power shaft is located within the through hole; wherein the first mechanism is connected to the second end of the coupling and the first mechanism is configured to rotate around the first perforation, and this in turn transmits rotation to the coupling.

In one embodiment of the invention, the element opening and closing machine further comprises a second support with a first perforation; a power shaft; a second mechanism comprising: a shaft with a first end and a second opposite end; a transmission mechanism connected to the power shaft and to the first end of the shaft; wherein, the transmission mechanism allows transforming the rotation of the power shaft into linear motion which is transmitted to the shaft; and a rod connected to the second opposite end of the shaft and to the first element, wherein the rod transmits motion to the first element. Particularly, in this embodiment the element opening and closing machine comprises a second coupling with a first end, a second end and a through hole, the second coupling being arranged concentrically in the first perforation of the second support, wherein, the power shaft is located within the through hole; wherein the second mechanism is connected to the second end of the second coupling; and wherein the first mechanism is configured to rotate around the first perforation, and this in turn transmits rotation to the second coupling.

DETAILED DESCRIPTION OF THE INVENTION

This invention is directed to an element opening and closing machine for the processing of raw material, where at least one element is mobile and the other element is fixed. In this case, the raw material passes between the elements, so that some type of process may be performed on it, such as laminating, grinding, milling, shelling, manufacturing drawn products, among others. Moreover, in processes in which raw material processing is carried out between elements, high loads may occur in the mechanisms in charge of generating the motion in the moving element or moving elements. This causes the elements making up the motion generating mechanisms to present failures, since in most of the machines opening and closing elements, these motion generating mechanisms are fixed to some element such as the chassis of the machine.

For example, most motion generating mechanisms consist of a worm gear connected to a power screw, wherein the power screw is connected to the moving element such as a roller, then when overloads occur in the process, the power screws usually fail by buckling, since the entire motion generating mechanism is fixed to the chassis of the element opening and closing machine, reducing the availability times of the machine.

Considering the foregoing, the element opening and closing machine of this invention comprises a mechanism in charge of the motion of a first element which is mobile, wherein said mechanism is connected with a coupling which permits rotation of the mechanism in charge of the mobile element motion, thus avoiding the failure by buckling of the mechanism in charge of the first element motion, in presence of high loads.

In order to understand this invention, the first element is going to be considered mobile, it is able to rotate around a rotation axis, and it may also move linearly.

Figure 1:
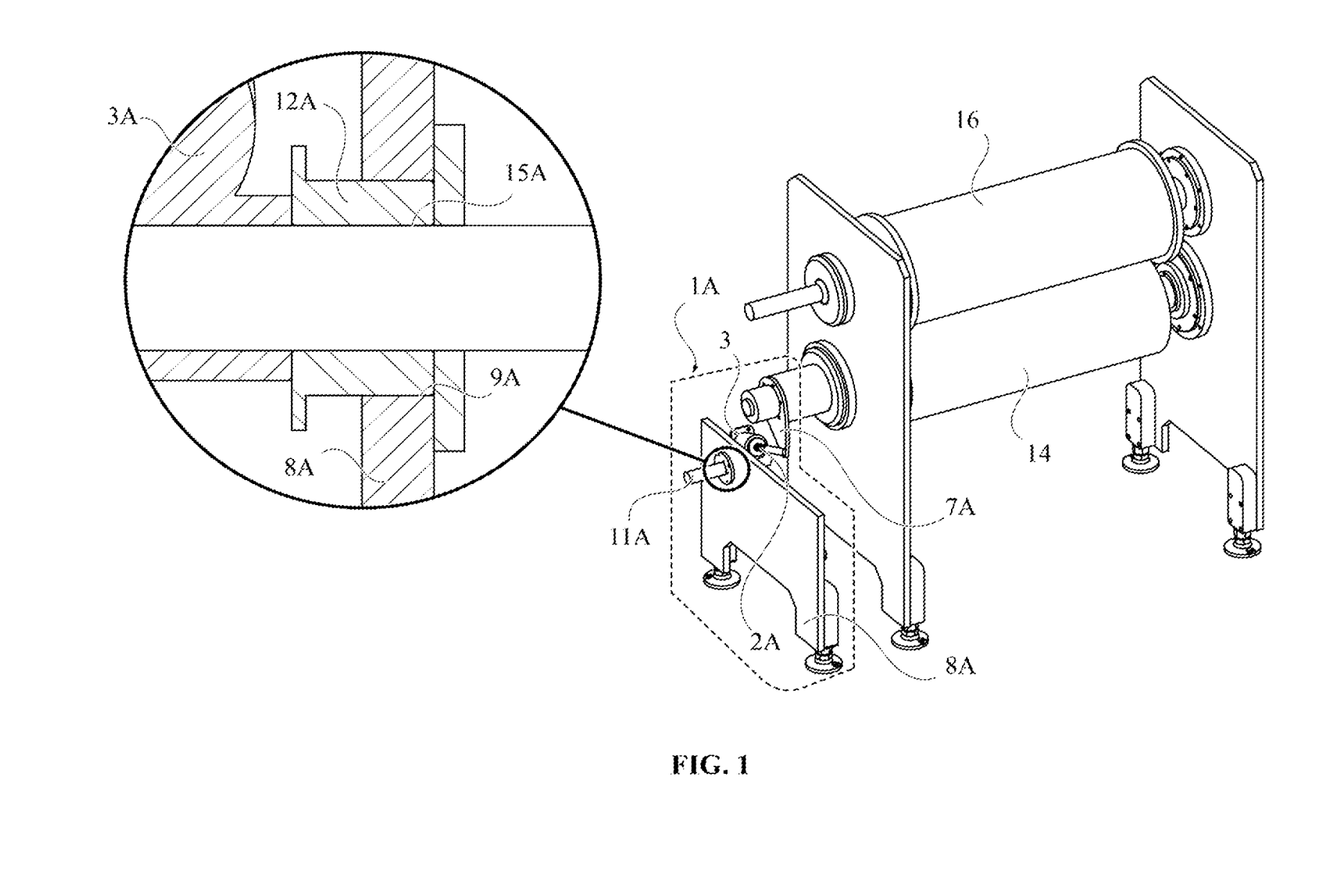
FIG. 1 shows one embodiment of the invention of an element opening and closing machine containing a first support with a first perforation, a first element, a second element, a first mechanism comprising a transmission mechanism, a rod and a shaft, a power shaft and a coupling.
Figure 2:
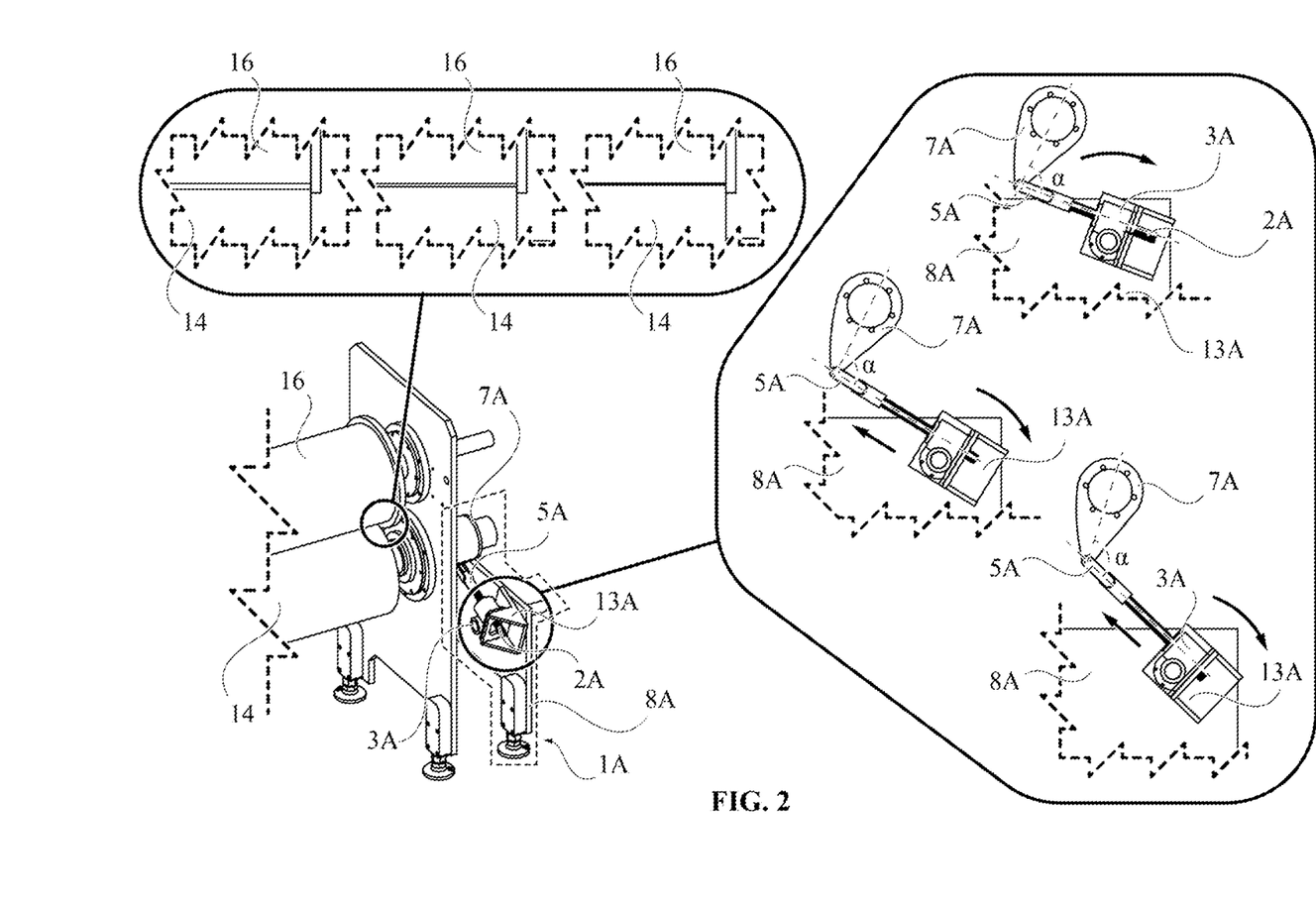
FIG. 2 shows one embodiment of the invention of an element opening and closing machine containing a first support with a first perforation, a first element, a second element, a first mechanism comprising a transmission mechanism, a rod and a shaft, a power shaft and a coupling. Particularly, the rotation of the first mechanism in three positions is shown and in addition, three distances between the first element and the second element are shown.

Referring to FIGS. 1 and 2, in one embodiment of invention the element opening and closing machine has a first element (14), a second element (16) facing the first element (14), a first support (8A) with a first perforation (9A) and a power shaft (11A). Said element opening and closing machine also has a first mechanism (1A) comprising: a shaft (2A) with a first end and a second opposite end; a transmission mechanism (3A) connected to the power shaft (11A) and to the first end of the shaft (2A). Wherein, the transmission mechanism (3A) allows transforming the rotation of the power shaft (11A) into linear motion that is transmitted to the shaft (2A); and a rod (7A) connected to the second opposite end of the shaft (2A) and to the first element (14), wherein the rod (7A) transmits motion to the first element (14).

Additionally, the element opening and closing machine also comprises: a first coupling (12A) with a first end, a second end and a through hole (15A). The first coupling (12A) is arranged concentrically in the first perforation (9A) of the first support (8A). Wherein, the power shaft (11A) is located within the through hole (15A), and wherein the first mechanism (1A) is connected to the second end of the first coupling (12A). Additionally, the first mechanism (1A) is configured to rotate around the first perforation (9A) of the first support (8B), and this in turn transmits rotation to the first coupling (12A).

In this embodiment, the first element (14) is the mobile element, since it is connected to the rod (7A) that transmits motion to the first element (14). On the other hand, the second element (16) is the fixed element and is located opposite the first element (14). The first element (14) moves with respect to the second element (16) generating a distance between them forming a space, through this space is where the raw material passes for processing. The first element (14) and the second element (16) may be connected in a chassis of the machine, which may be at least a sheet or plate.

On the other hand, and depending on the industry the raw material may be different, in a particular example, in the food industry the raw material may be a mixture of flour, water, vegetable fat and other components which form a soft dough when they are homogenized, e.g., to bake cookies. On the other hand, the mechanism may be implemented in the metallurgical industry in steel laminating, specifically, e.g., in the creation of high precision hot and cold drawing, where the raw material is steel. On the other hand, in the textile industry, where the raw material is a textile material such as fabric, as well as in the chemical industry.

The raw material that is processed in the element opening and closing machine passes between the first element (14) and the second element (16), therefore, the distance between the first element (14) and the second element (16) is an important variable in this type of machine. This distance varies according to the process carried out and may even vary during some processes, e.g., if the element opening and closing machine is used in processes such as laminating of flour doughs, the distance between the first and second elements (14, 16) are in a range between 0.05 mm to 300 mm. Preferably, the distance between the first and second elements (14, 16) are in a range between 0.2 mm and 7 mm.

Optionally, the first element (14) and the second element (16) are rollers, which may be selected from crushing rollers, laminating rollers, milling rollers, shelling rollers, among types of rollers through which between two rollers passes some raw material. In a particular example, the first element (14) and the second element (16) are laminating rollers which have a rotation axis, which allows the first element (14) and the second element (16) to rotate. In another particular example, the first element (14) and the second element (16) are shafts. The second element (16) may also be a flat surface which allows, as the first element (14) approaches the second element (16) to allow processing of the raw material passing between the first element (14) and the second element (16). In the case that the first element (14) and the second element (16) are laminating rollers, these may have heat treatments depending on the material to be manufactured, the heat treatment applied to the laminating rollers may be selected from the group conformed by simple annealing, spheroidization or globulization annealing, double annealing, standardization, air hardening, induction water hardening, tempering or other heat treatment known by a person moderately versed in the matter or combinations of the previous ones.

The material of the first element (14) and the second element (16) may be selected from the group consisting of carbon steel, 1020 steel, 1045 steel, 4140 steel, 1085 steel, iron castings, galvanized iron, chromium steels, chromium-nickel steels, chromium-nickel-titanium steels, nickel-chromium-molybdenum-tungsten alloy, ferrous chromium-molybdenum alloys, stainless steel 301, stainless steel 302, stainless steel 304 and 304L, stainless steel 316 and 316L, stainless steel 405, stainless steel 410, stainless steel 430, stainless steel 442, austenitic stainless steel, ferritic stainless steel, martensitic stainless steel, nodular cast irons, pearlitic cast irons, manganese alloyed steel, natural rubber, polyisoprene, polybutadiene, cast iron, styrene-butadiene rubber, butyl rubber, nitrile rubber, materials used in the food industry, and combinations thereof. When the first and second elements (14, 16) are of the aforesaid materials, such as, e.g., a stainless steel, it allows their use to work with foodstuffs, or with materials for obtaining foodstuffs.

Optionally, the first element (14) and the second element (16) are composed of the hollow cylinder which may be manufactured from stainless steel 304-L, this material is preferably as the raw material passing between the first and second element (14, 16) is a mass of food, thereby avoiding any contamination of the food. On the other hand, the first element (14) and the second element (16) consist of the hollow cylinder which may be made of cast iron with variety in carbon content. In this embodiment, the rotating shaft may be made of commercial carbon steel, for example, since said rotating shaft does not come into contact with the raw material passing between the first and second elements (14, 16).

Moreover, the first element (14) and the second element (16) may comprise a hollow cylinder that is connected to a pivot axis, wherein said pivot axis goes through the hollow cylinder, longitudinally. In a particular example, the first element (14) has an eccentric pivot axis designed to establish the displacement made by said first element (14) towards the second element (16).

On the other hand, and as mentioned above, the element opening and closing machine comprises a first mechanism, which is connected to the first support (8A) and is connected to the first element (14). Generally speaking, the first mechanism (1A) is responsible for moving the first element (14) to achieve a desired distance between the first element (14) and the second element (16).

The first mechanism (1A) is connected to a power shaft (11A) having two ends, a first end and a second end, and disposed in the through hole (15A) of the first coupling (12A). The power shaft (11A) is connected at its first end to a power input of the transmission mechanism (3A) which transmits torque thereto. The power shaft (11A) may be coupled at its second end to a hand tool, a hydraulic motor, an electric motor, a pneumatic motor, or any type of tool or device that allows torque to be applied to the power shaft (11A). In particular example, the power shaft (11A) is connected to an electric motor (4A).

Continuing with FIG. 1, the first mechanism (1A) has a transmission mechanism (3A), said transmission mechanism (3A) has the power input where the power shaft (11A) is connected and a power output connected to the shaft (2A) and may be housed in a case. The transmission mechanism (3A) allows transforming the torque exerted by the power shaft (11A) at the power input into linear motion on the shaft (2A).

For the understanding of this invention, power input is going to be considered an element which is in charge of receiving the motion of an external element, which in this case is the power shaft (11A). In turn, and for the understanding of this invention, power output is going to be considered an element which is in charge of transmitting the motion received by the power input to another external element, which in this case may be the shaft (2A).

The transmission mechanism (3A) may be selected from the group consisting of worm gear mechanism, rack and pinion mechanism, connecting rod-crank mechanism, screw-nut mechanism or any mechanism that allows transforming the torque of the power shaft into linear motion of the shaft (2A).

On the other hand, the first mechanism (1A) also has the shaft (2A) with a first end connected to the power output of the transmission mechanism (3A) and a second opposite end connected to the rod (7A). Wherein the shaft (2A) is responsible for transmitting motion to the rod (7). In a particular example, the transmission mechanism (3A) is a worm gear mechanism housed in a case, in this case the shaft (2A) is a power screw which is connected to the worm gear which is the power output of the transmission mechanism (3A), the power shaft (11A) is connected to a driven gear which is the power input of the transmission mechanism (3A). In another particular example, the transmission mechanism (3A) is a housed in a case, wherein the shaft (2A) is a power screw and is operationally connected to a pinion gear.

On its side, at the second end the shaft (2A) connects the rod (7A), in turn the rod (7A) connects to the first element (14), wherein the rod (7A) is responsible for transmitting the motion of the shaft (2A) to the first element (14). In a particular example, the rod (7A) has a first end that may be connected to the second end of the shaft (2A), and an opposite second end connectable to the first element (14). In one embodiment of the invention, the shaft (2A), the rod (7A) and the first element (14) comprise a connecting rod-crank mechanism, wherein the rod (7A) is the connecting rod. The rod (7A) and the shaft (2A) are directly connected by connecting means (e.g., pin). In another embodiment of the invention, the rod (7A) is an eccentric cam and the follower is the shaft (2A).

The rod (7A) may have two holes, wherein the first hole is connected to the shaft (2A) by means of a connecting element (e.g., pin) and the second hole is coupled with an end of the first element (14). Optionally, the second hole is coupled with an end of a pivot shaft of the first element (14).

Referring to FIGS. 1 and 2, the element opening and closing machine comprises a first coupling (12A) with a first end, a second end and has a through hole (15A) receiving the power shaft (11A). Said first coupling (12A) is disposed in the first perforation (9A) of the first support (8A). The first coupling (12A) is supported but not fixed in the first perforation (9A), i.e., the first coupling (12A) may rotate in the first perforation (9A). Additionally, the first coupling (12A) is connected at its second end to the first mechanism (1A) by means of fastening elements, so that when the first coupling (12A) rotates, the first mechanism (1A) rotates accordingly. In a particular example, the first coupling (12A) is connected with the transmission mechanism (3A), in these cases the transmission mechanism (3A) has a housing. One of the technical effects allowing the first mechanism (1A) to rotate, is that in the presence of high loads in the machine avoids the failure by buckling of the shaft (2A), since this is not connected to any fixed element, it may rotate relieving loads.

The first mechanism (1A) is in charge of moving the first element (14) towards the second element (16), since the first mechanism (1A) is connected with the first coupling (12A), which rotates in the first perforation (9A), when the motion of the first element (14) is generated, the first mechanism (1A) has a tilting motion that is related to the motion of the first element (14). This tilting motion also allows to improve the system torque, since the highest torque is obtained when the rod (7A) and the shaft (2A) are orthogonal to each other, therefore, the shaft (2A) allows these elements to remain orthogonal at different points of the operation of the system, by having the tilting motion.

Referring to FIG. 2, the connection between the first coupling (12A) and the first mechanism (1A) allows the first mechanism (1A) to rotate at angle α in a range between 40° and 170°, wherein the angle α is measured between a longitudinal axis of the shaft (2A) and a longitudinal axis of the rod (7A). In particular example, the first mechanism (1A) may rotate at angle α in a range between 75° and 110°.

Referring to FIG. 2, it may be noticed how the first mechanism (1A) rotates as the first element (14) moves towards the second element (16). Specifically, in this embodiment, the transmission mechanism (3A) is connected to the first coupling (12A), whereby the first mechanism (1A) may rotate with respect to the rod (7A) at an angle α, as the first coupling rotates in the first perforation (9A) around the power shaft (11A). In said FIG. 2, in one embodiment of the invention, three positions of the first element (14) are observed, in a first position the distance between the first element (14) and the second element (16) is 0.21 mm, i.e., the first element (14) and the second element (16) are in contact and the angle α of the first mechanism (1A) is 75°. In a second position, the distance between the first element (14) and the second element (16) is 2 mm and the angle α of the first mechanism (1A) is 90°. Finally, in the third position, the distance between the first element (14) and the second element (16) is 7 mm and the angle α of the first mechanism (1A) is 110°.

The foregoing means, when there is some element or raw material generating loads between the first element (14) and the second element (16), and when the angle α of the first mechanism (1A) changes, the fact that said first mechanism (1A) rotates, allows the shaft (2A) to rotate as well, reducing the loads on it, increasing its lifespan. Additionally, the fact that the lifespan of said shaft (2A) is increased, allows to increase the availability of the element opening and closing machine, thus reducing the amount of maintenance required.

There are different ways for the first element (14) to achieve displacement towards the second element (16), e.g., in a non-illustrated embodiment, the first support (8A) has a second bore (10A) which is a slot that may be vertical, which serves as a guide for the first element (14) to move towards the second element (16), i.e., as the first element (14) moves along said slot, the first element (14) may move away from or toward the second element (16). In this embodiment, the second end shaft (2A) connects the rod (7A), in turn the rod (7A) connects to the first element (14). Said rod (7A) exerts force on the first element (14), allowing it to slide along the slot.

Optionally, the rod (7A) and the shaft (2A) are connected by means of an element, wherein said element may be a clevis (5A) with two ends, wherein the clevis (5A) may be connected at one end either by threading or by welding to the second end of the shaft (2A) and at its opposite end is connected to the rod (7A) by means of connecting elements (e.g., pins). This allows coupling and uncoupling of the clevis (5A) and/or to the rod (7A) when required. Additionally, the clevis (5A) facilitates the manufacture of the shaft (2A), since, e.g., when the shaft (2A) is a power screw, operations on the second end of the shaft (2A), which may also affect the threading of the power screw, are avoided, i.e., the fact of including a clevis (5A) allows this to be connected to the shaft (2A) without damaging the threads when this is a power screw.

Figure 3:
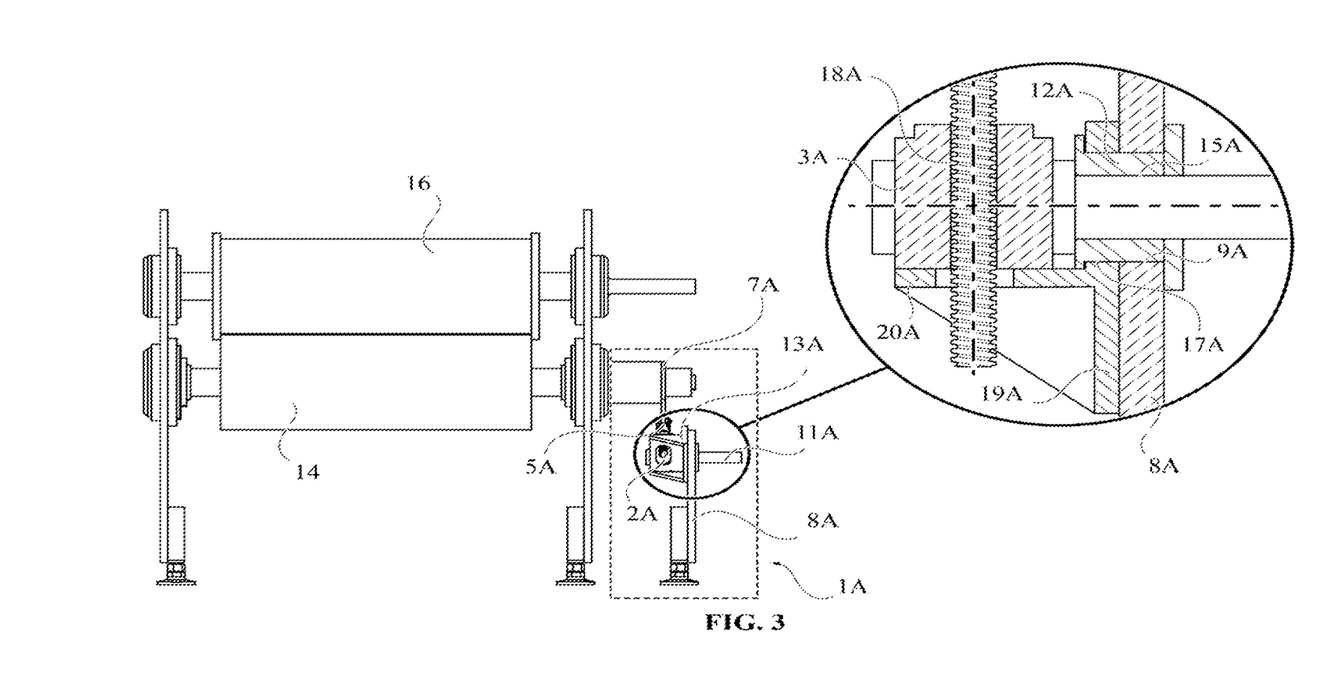
FIG. 3 shows one embodiment of the invention of an element opening and closing machine containing a first support with a first perforation, a first mechanism comprising a transmission mechanism, a rod and shaft, a power shaft, a pivoting support, a clevis, an eccentric bushing and a coupling.
Figure 4:
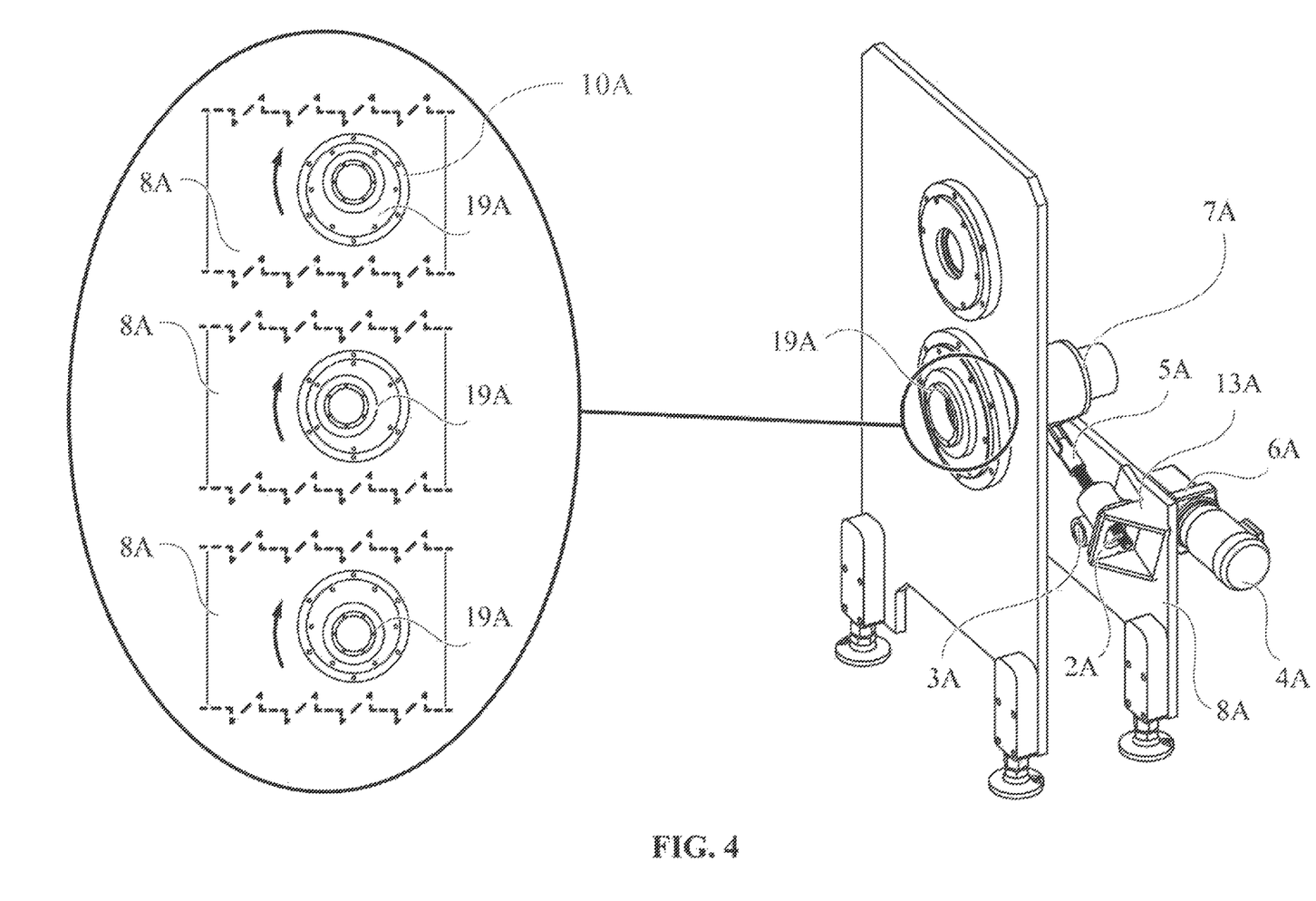
FIG. 4 shows one embodiment of the invention of an element opening and closing machine containing a first support with a first perforation and a second perforation, a first mechanism comprising a transmission mechanism, a rod and a shaft, a power shaft, a pivoting support, a clevis, an eccentric bushing and a coupling. In particular, the rotation of the eccentric bushing in three positions is shown.

Referring to FIGS. 2, 3 and 4, the rod (7A) and the shaft (2A) are connected by means of a clevis (5A), wherein said clevis (5A) is connected to the second end of the shaft (2A). In said FIG. 3, the clevis (5A) at the end opposite to where it connects to the shaft (2A) is connected to the rod (7A) by means of a pin. In said embodiment, the clevis (5A) at the end has two holes coinciding with a hole that the rod (7A) may have at one of its ends, whereby, in said hole of the rod (7A) the pin is inserted, thus allowing to obtain a connection between the rod (7A) and the clevis (5A).

On the other hand, and referring to FIG. 4, the first element (14) is connected at one of its ends to an eccentric bushing (19A) (in this figure for ease the first element (14) is not shown). Specifically, and referring to FIG. 4, the first element (14) is connected at one end to the eccentric bore of said eccentric bushing (19A). Additionally, said eccentric bushing (19A) may be disposed in a second bore (10A) of the first support (8A). For the understanding of this invention, it will be understood by eccentric bushing (19A) to a bushing which does not have its bore at its geometrical center, as seen in FIG. 4.

In said FIG. 4, it is shown how the eccentric bushing (19A) allows rotation and displacement of the first element (14). As the shaft (2A) moves the rod (7A), it transmits rotation to the first element (14), and due to the eccentricity of the eccentric bushing (19A), the motion of the first element (14) allows the eccentric bushing (19A) to rotate. When said eccentric bushing (19A) rotates its eccentric bore moves, making the motion shown in FIG. 4.

Such motion of the eccentric bushing (19A) allows the first element (14) to move toward the second element (16) while rotating about the center of the eccentric bushing (19A). Continuing with FIG. 4, three positions that the first element (14) may have around the center of the eccentric bushing (19A) are shown to illustrate the motion.

On the other hand, and in one embodiment of the invention, the element opening and closing machine may have a pivoting support (13A) which supports the transmission mechanism (3A) and by means of which the first mechanism (1A) and the first coupling (12A) are connected. The pivoting support (13A) may be connected to the second end of the first coupling (12A) by means of fastening elements such as by screws or welding.

Referring to FIGS. 3 and 4, in an inventive embodiment of the element opening and closing machine, the first mechanism (1A) is connected to the second end of the first coupling (12A) through a pivoting support (13A) having a first hole (17A) and a second hole (18A). Preferably, said second hole (18A) is arranged collinear to the first perforation (9A) of the first support (8A). The above allows said pivoting support (13A) to rotate around the first support (8A). In particular, the shaft (2A) is inserted into the first perforation (17A) of the pivoting support (13A) and the transmission mechanism (3A) is arranged in the pivoting support (13A).

Optionally, the pivoting support (13A) is an element having at least two surfaces connected at one end by fastening means (e.g., welding), wherein a first surface (19A) is connected to the first coupling (12A) and the second surface (20A) supports the transmission mechanism (3A). The second surface (20A) is not coplanar with respect to the first surface (19A), in a particular example, the first surface (19A) and the second surface (20A) of the pivoting support (13A) are orthogonal to each other.

When said surfaces of the pivoting support (13A) are orthogonal to each other, it is desired when having transmission mechanisms (3A) connecting perpendicular axes. In view of the above, when the second hole (18A) is located in the first surface of the pivoting support (13A), the first hole (17A) is located in the second surface of the pivoting support (13A). Additionally, the surfaces of the pivoting support (13A) may form a monolithic body.

The technical effect of having the pivoting support (13A) is to facilitate the connection between the first coupling (12A) and the first mechanism (1A), thus allowing the pivoting support (13A) to rotate, and also to facilitate maintenance, which increases the availability time of the machine for opening and closing the elements.

The first hole (17A) and the second hole (18A) have rotation axes, wherein each rotation axis passes through the center of the respective hole (17A, 18A). The orientation of said rotation axis is defined by the angle of the holes (17A, 18A) with respect to their respective surface. For example, in one embodiment of the invention the first hole (17A) and the second hole (18A) are orthogonal with respect to the first and second surfaces (19A, 20A) of the pivoting support (13A) respectively.

Continuing with FIG. 3, in one embodiment of the invention, the rotation axes of the first hole (17A) and second hole (18A) of the pivoting support (13A) are orthogonal to each other. The foregoing facilitates the use of transmission mechanism (3A) wherein the power shaft (11A) connecting to the power input of the transmission mechanism (3A) and the shaft (2A) are perpendicular to each other, as they may be in a worm gear mechanism.

Referring to FIGS. 1, 2, 3 and 5, in one embodiment of the invention, the first element (14) and the second element (16) are supported on a chassis, in this case, the first support (8A) having the first perforation (9A), in which the first coupling (12A) is disposed, may be a sheet or a plate which is located next to the chassis. The technical effect of the above is that it allows the first mechanism to be adapted to existing machines, without having to modify the structure of the machine very much.

In one embodiment of the invention, the first support (8A) may be the same chassis of the one that holds the first element (14) and the second element (16), which allows a better use of the space occupied by the machine for opening and closing the elements.

Figure 5:
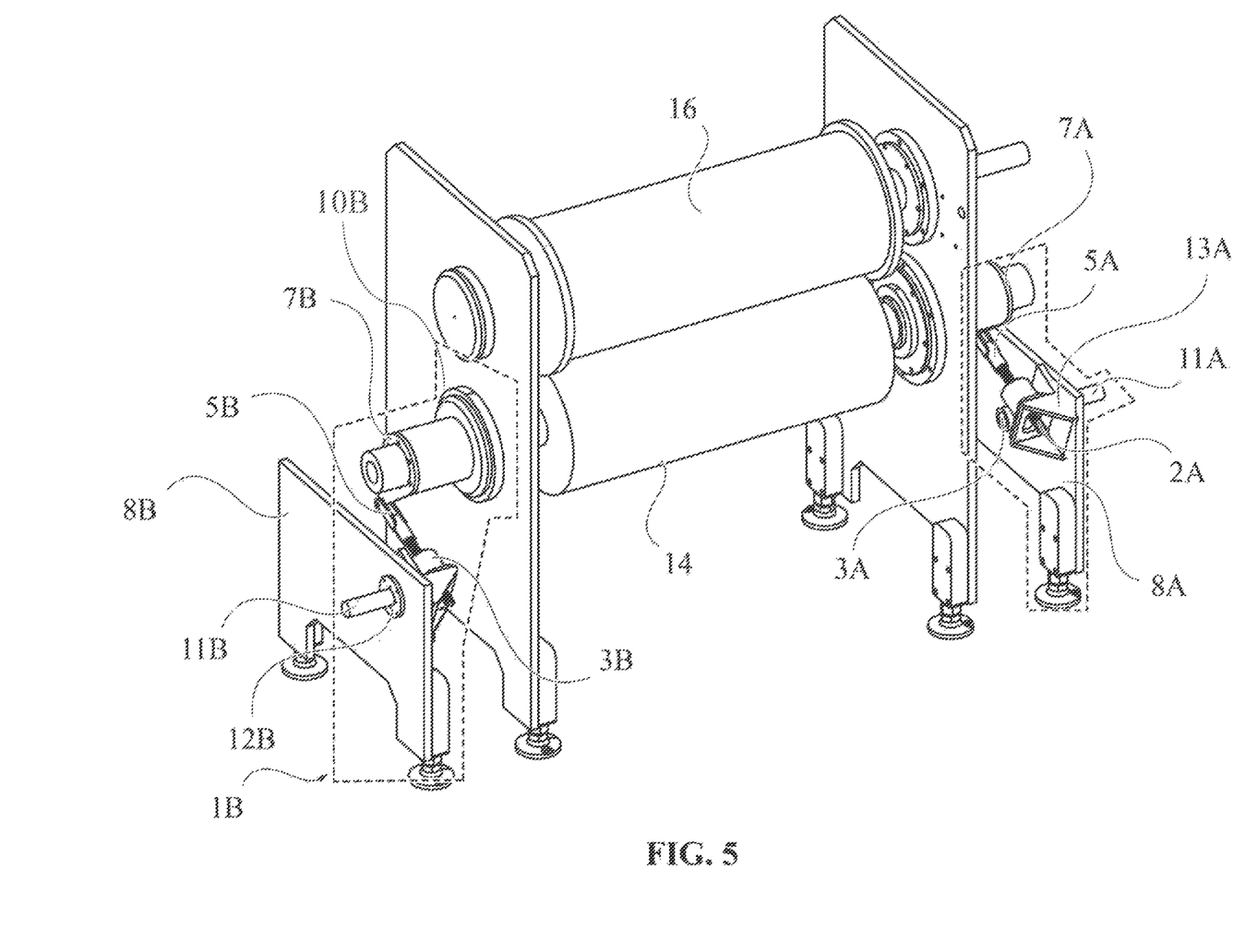
FIG. 5 shows one embodiment of the invention of an element opening and closing machine containing a first support with a first perforation, a second support with a first perforation, a first element, a second element, a first mechanism comprising a transmission mechanism, a rod and a shaft, a second mechanism comprising a transmission mechanism, a rod and a shaft, two power shafts and two couplings.
Figure 6:
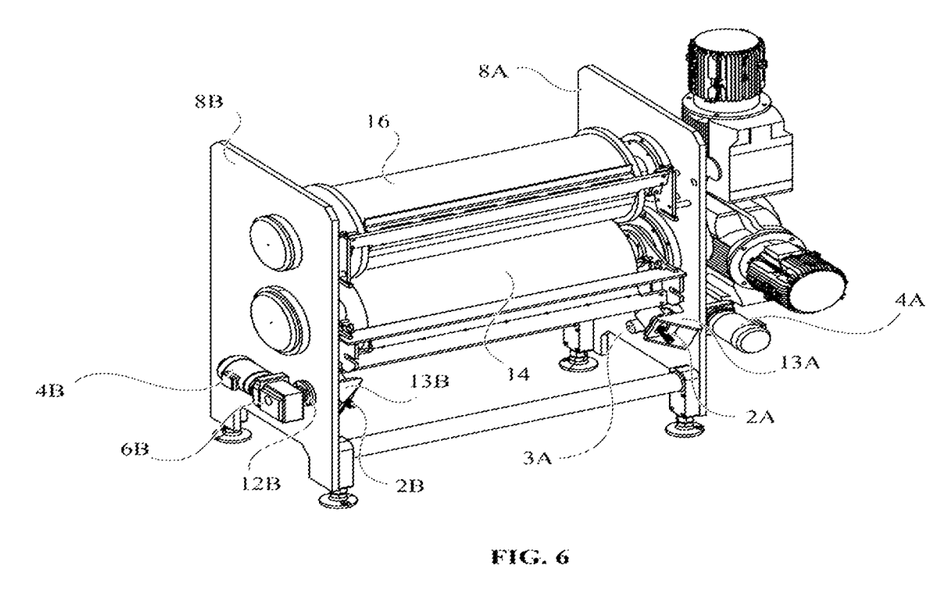
FIG. 6 shows one embodiment of the invention of an element opening and closing machine containing a first support with a first perforation and a second perforation, a second support with a first perforation and a second perforation, a first element, a second element, a first mechanism comprising a transmission mechanism, a rod and a shaft, a second mechanism comprising a transmission mechanism, a rod and a shaft, two power shafts and two couplings.
Figure 7:
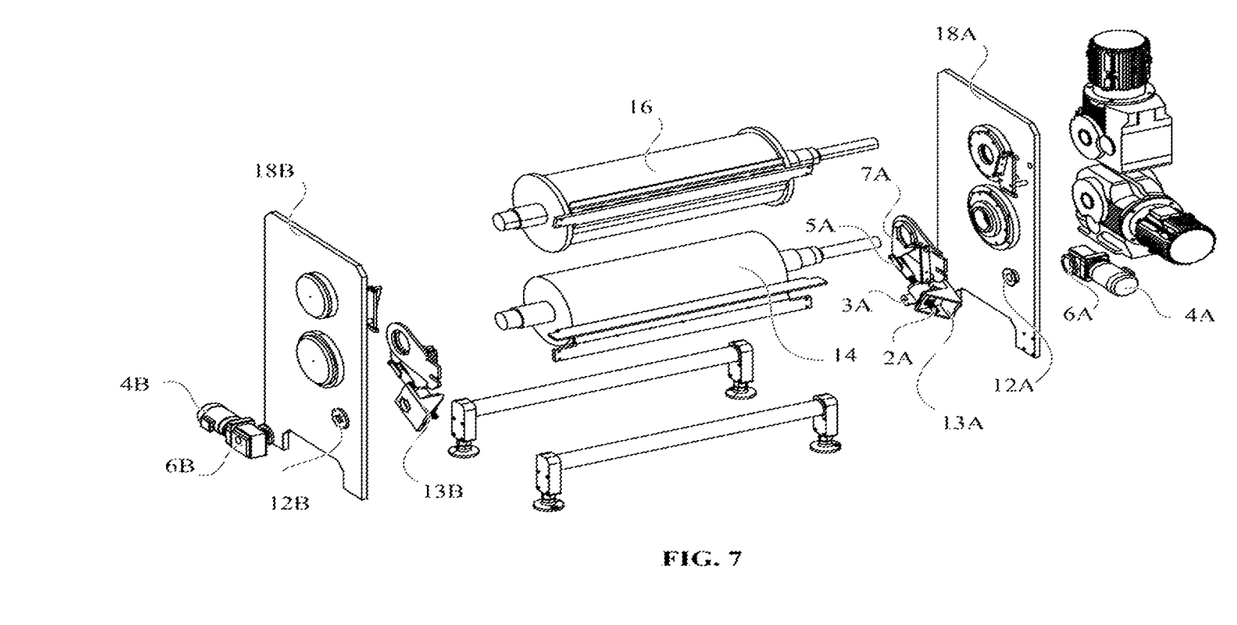
FIG. 7 shows an exploded view of one invention embodiment of an element opening and closing machine containing a first support with a first perforation and a second perforation, a second support with a first perforation and a second perforation, a first element, a second element, a first mechanism comprising a transmission mechanism, a rod and a shaft, a second mechanism comprising a transmission mechanism, a rod and a shaft, two power shafts and two couplings.

Referring to FIGS. 4, 6 and 7, the element opening and closing machine has a first support (8A) with a first perforation (9A), where the first coupling (12A) is disposed and a second bore (10A), where an end of the first element (14) is disposed. In this case and as may be seen in FIGS. 4, 6 and 7, a saving in space may be noticed in comparison when the first support (8A) is a different element to the chassis of the machine as seen in FIGS. 1, 2, 3, and 5.

As mentioned above, the power shaft (11A) may be connected to a motor (4A), which is responsible for transmitting torque to the power shaft (11A). In a particular example, the motor (4A) is an electric motor which is connected to a transmission mechanism (6A) which may be a gear reducer.

Referring to FIG. 4, in one embodiment of the invention the motor (4A) has a transmission mechanism (6A) and is connected to the first end of the first coupling (12A) by means of fastening elements. The foregoing allows both the first mechanism (1A) and the motor (4A) to rotate in the presence of high loads avoiding possible failures that may transmit the power shaft (11A), if only the first mechanism (1A) rotates and the motor (4A) does not.

Optionally, the first coupling (12A) is provided with coupling elements (e.g., plates) at least at one of its ends to facilitate the connection with the different elements that are connected to the first coupling (12A), either the case of the transmission mechanism (3A), the pivoting support (13A) and/or the motor (4A). In a particular example, the coupling elements may be connected by fastening elements to the first coupling (12A). On the other hand, the coupling elements may form a monolithic element with the first coupling (12A). One of the technical effects of having the coupling elements is that it facilitates the coupling with the elements to be connected to the first coupling (12A).

Referring to FIG. 6, the first coupling (12A) at the first and second ends has coupling elements which are plates with holes, wherein the holes are provided with fastening elements that allow the connection of the motor (4A) and the first mechanism (1A) with the plates. In this case, the plate connected to the first end of the first coupling (12A) has some additional holes, in which some fastening elements are arranged allowing the connection between the plate and the first coupling (12A). Both the first coupling (12A) and the coupling elements are not fixed to the first support (8A). Therefore, it may rotate in the first perforation (9A).

On the other hand, the element opening and closing machine may have a first element (14) and a second element (16) which may be laminating rollers with weights from 1000 kg up to 41000 kg, in these cases a first mechanism (1A) is not enough to move the first element (14) towards the second element (16). Therefore, the element opening and closing machine can have a second mechanism (1B), which is identical to the first mechanism (1A), since they share the same elements and therefore it is to be understood that the same modalities described with respect to the first mechanism (1A) are fulfilled for the second mechanism (1B). It should be understood that the first mechanism (1A) and the second mechanism (1B) are independent mechanisms and may be moved separately, if desired. However, for proper operation of the element opening and closing machine, the first mechanism (1A) and the second mechanism (1B) must be synchronized to avoid misalignment of the first and second elements (14, 16).

Referring to FIG. 5, in one embodiment of the invention, the element opening and closing machine has a second support (8B) with a first perforation (9B) and a power shaft (11B). Said element opening and closing machine also has a second mechanism (1B) comprising: a shaft (2B) with a first end and a second opposite end, a transmission mechanism (3B) connected to the power shaft (11B) and to the first end of the shaft (2B). Wherein, the transmission mechanism (3B) allows transforming the rotation of the power shaft (11B) into linear motion that is transmitted to the shaft (2B); and a rod (7B) connected to the second opposite end of the shaft (2B) and to the first element (14), wherein the rod (7B) transmits motion to the first element (14).

Moreover, the element opening and closing machine also comprises: a second coupling (12B) with a first end, a second end and a through hole (15B). The second coupling (12B) is arranged concentrically in the first perforation (9B) of the second support (8B). Wherein, the power shaft (11B) is located within the through hole (15B), and wherein the second mechanism (1B) is connected to the second end of the second coupling (12B). Furthermore, the first mechanism (1B) is configured to rotate around the first perforation (9B), and this in turn transmits rotation to the second coupling (12B).

Continuing with FIG. 5, it may be seen how the first support (8A) and the second support (8B) face each other and a distance between them determined by the length of the first element (14), it may also be seen that the first support (8A) and the second support (8B) are located next to the chassis supporting the first and second elements (14, 16). In FIG. 5, in one embodiment of the invention, the first perforation (9A) of the first support (8A) and the first perforation (9B) of the second support (9B) are collinear, this prevents misalignments from occurring when displacement of the first element (14) toward the second element (16) is performed.

On the other hand, and referring to FIGS. 6 and 7, in one embodiment of the invention, the first support (8B) and the second support (8) are the chassis of the element opening and closing machine. In this case, in order to maintain the distance between the first support (8A) and the second support (8B), the element opening and closing machine has at least one spacer located between and the first and second supports (8A, 8B), said spacer being connected to the first support (8A) and the second support (8B).

Referring to FIG. 5, the element opening and closing machine comprises a second coupling (12B) with a first end, a second end and has a through hole (15B) receiving the shaft (11B), said first coupling (12B) being disposed in the first perforation (9B) of the first support (8B). In the same manner as the first coupling (12A) with the first mechanism (1A), the second coupling (12B) is connected to the second mechanism (1B) at one end.

Optionally, the first and second couplings (12A, 12B) are bushings which are located in the first perforations (9A, 9B). In one embodiment of the invention, and when the first and second couplings (12A, 12B) are bushings, they allow rotation within the perforations (9A, 9B) of the first and second supports (8A, 8B). The first and second couplings (12A, 12B) may be made of a material selected from the group consisting of carbon steel, steel 1020, steel 1045, steel 4140, steel 1085, iron castings, galvanized iron, chromium steels, chromium-nickel steels, chromium-nickel-titanium steels, nickel-chromium-molybdenum-tungsten alloy, ferrous chromium-molybdenum alloys, 301 stainless steel, 302 stainless steel, 304 and 304L stainless steel, 316 and 316L stainless steel, 405 stainless steel, 410 stainless steel, 430 stainless steel, 442 stainless steel, manganese alloyed steel and combinations thereof. In a particular example, the first and second couplings (12A, 12B) are fabricated from a high toughness and hardness material, such as, e.g., M 238 trademark steel which is a quenched and tempered steel.

As with the first mechanism (1A) and as explained above, the connection between the second coupling (12B) and the second mechanism (1B) allows the second mechanism (1B) to rotate at an angle α in a range between 40° and 170°. In particular example, the second mechanism (1A) may rotate at angle α in a range between 75° and 110°.

In the same way as the first mechanism (1A) and referring to FIGS. 5, 6 and 7, the second mechanism (1B) is connected to the second end of the second coupling (12B) through a pivoting support (13B) having a first hole (17B) and a second hole (18B), said second hole (18B) being disposed collinearly to the first perforation (9A) of the second support (18B); wherein, the shaft (2B) is located in the first hole (17B) of the pivoting support (13B) and the transmission mechanism (3B) is disposed in the pivoting support (13B). Particularly, the rotation axes of the first hole (17B) and second hole (18B) of the pivoting support (13B) are orthogonal to each other.

On the other hand, the power shaft (11B) may also be connected to a motor (4B), said motor (4B) may in turn be connected to the first end of the second coupling (12B). Similarly, as the motor (4A) to the power shaft (11A), the motor (4B) is responsible for transmitting torque to the power shaft (11B). Referring to FIG. 5, in one embodiment of the invention, the motor (4A) is connected to the power shaft (11B) through a transmission mechanism (6B), said transmission mechanism (6B) being connected to the first end of the second coupling (12b) by means of fastening elements. In a particular example, the motor (4B) is an electric motor which is connected to the transmission mechanism (6B) which may be worm gear speed reducers, gear speed reducers, cycloidal gear reducers, planetary speed reducers, internal gear reducers, external gear reducers or combinations thereof.

The motors (4A, 4B) may be an electric motor that is selected from AC motors (e.g., three-phase synchronous motors, synchronous asynchronous motors, motors with a permanent magnet rotor, single-phase motors, two-phase motors, motors with auxiliary start winding, motors with auxiliary start winding and with capacitor), DC motors (e.g., series excitation motors, parallel excitation motors, compound excitation motors), stepper motors (e.g., with encoder, with motor brake, with heat sinks, with inertial heat sinks, with single, two or three stage planetary gear reducers), NEMA 8, NEMA 11, NEMA 17, NEMA 23 or NEMA 34 class stepper motors, equivalent electric motors known to a person moderately knowledgeable in the field, or combinations thereof. The above allows control of the rotation of the motor output shaft, which allows control of the displacement of the first element (14).

Optionally, in order to achieve displacement of the first element (14) towards the second element (16) when the element opening and closing machine has a second mechanism (1B), the first element (14) may be connected to an eccentric bushing (19A, 19B) at each end of the first element (14), an eccentric bushing (19B) is disposed in a second bore (10B) of the second support (8B) and the eccentric bushing (19A) is disposed in the second bore (10A), said second bore (10A) being collinear with the second bore (10B) of the second support (8B). In a particular example, the eccentric bushings (19A, 19B) are arranged in a bearing which may be selected from the group consisting of deep slot ball bearing, spherical roller bearing, cylindrical roller bearing, tapered roller bearing and thrust ball bearing.

Referring to FIG. 5, in one embodiment of the invention, the second mechanism (1B) has a transmission mechanism (3B), said transmission mechanism (3B) has the power input where the power shaft (11B) is connected and a power output connected to the shaft (2B) and may be housed in a case. The transmission mechanism (3B) is responsible for transforming the torque exerted by the power shaft (11B) at the power input into linear motion on the shaft (2B). In a particular example, the transmission mechanism (3B) is a worm gear mechanism housed in a case, in this case the shaft (2B) is a power screw which is connected to the worm which is the power output of the transmission mechanism (3B), the power shaft (11B) is connected a driven gear which is the power input of the transmission mechanism (3B).

In a particular example, the shafts (2A, 2B) are power screws that are connected to the power output of the transmission mechanism (3A, 3B) respectively. A power screw is to be understood as a threaded mechanical device that converts an angular rotation or displacement into a rectilinear displacement, transmitting mechanical force and power. On the other hand, the shafts (2A, 2B), which are power screws, may be selected by their thread type, such as, e.g., power screw with square thread, power screw with trapezoidal or ACME thread, power screw with sawtooth thread, power screw with round thread and power screw with unified thread and combinations thereof.

On the other hand, in one embodiment of the invention, the rod (7B) and the shaft (2B) are connected by means of an element, the element may be a clevis (5B) having two ends, wherein the clevis (5B) may be connected at one end either by threading or by welding to the second end of the shaft (2B) and at its opposite end is connected to the rod (7B) by means of connecting elements (e.g., pins). Referring to FIG. 5, the rod (7B) and the shaft (2B) is connected by means of a clevis (5B), wherein said clevis (5B) is connected to the second end of the shaft (2A). The clevis (5B) facilitates the manufacture of the shaft (2A), since e.g., when the shaft (2B) is a power screw it avoids performing operations on the second end of the shaft (2B) which may also affect the threading of the power screw. Continuing in FIG. 5, the clevis (5B) at the end opposite to where it is connected to the shaft (2B) is connected to the rod (7B) by means of pins, in this embodiment the clevis (5B) at the end has two holes that coincide with a hole that the rod (7B) may have at one of its ends, through these holes passes a pin, to obtain a connection between the rod (7B) and the clevis (5B).

Additionally, in an embodiment not shown, at one end of the pins connecting the devises (5A, 5B) to the rods (7A, 7B), a slot may be provided, in which a locking ring or seeger ring is located, these locking rings retaining the pins in the devises (5A, 5B).

Optionally, the second coupling (12B) has coupling elements (e.g., plates) at least at one of its ends to facilitate the connection with the different elements that are connected to the first coupling, either the transmission mechanism housing (3B), the pivoting support (13B) and/or the motor (4B). Referring to FIG. 7, the second coupling (12B) at the first and second ends has coupling elements which are plates with holes, wherein in the holes are arranged fastening elements that allow the connection of the motor (4B) and the second mechanism (1B) with the plates. In this case, the plate connected to the first end of the second coupling (12B) has additional holes, in which fasteners are arranged allowing the connection between the plate and the second coupling (12B). Both the first coupling (12B) and the coupling elements are not fixed to the second support (8B), so that it can rotate in the first perforation (9B).

In a non-illustrated embodiment, the element opening and closing machine is provided with a computing unit, a device for processing data or signals coming from some external element, said computing unit being connected to at least one or both of the motors (4A, 4B). In this embodiment, the motors (4A, 4B) have a controller that is connected to the computing unit. The computing unit is configured to send a signal to the controller of each motor (4A, 4B), the controller upon receiving said signal activates the corresponding motor (4A, 4B). Now, once the computing unit stops the signal, the controller stops the corresponding motor (4A, 4B). In one embodiment of the invention, the computing unit is configured to send two types of signals, a clockwise signal and a counterclockwise signal, in this case, the controller is configured to once these signals are received activate the motors (4A, 4B) and rotate clockwise or counterclockwise depending on the signal received.

With the activation and deactivation of the motor or motors (4A, 4B) and with their rotating direction, the computing unit controls the distance between the first element (14) and the second element (16). In order to improve the operation of the computing unit, in one embodiment of the invention, the element opening and closing machine has a distance sensor arranged on the chassis of the machine or on the first support (8A) or on the second support (8B), this distance sensor is connected to the computing unit and is configured to send a signal to the computing unit, said signal is processed by the computing unit to obtain some data of the current distance between the first and the second element (14, 16).

The distance sensor may be selected from the group consisting of infrared distance sensors, ultrasonic distance sensors, laser triangulation sensors, confocal sensors, capacitive sensors, magneto-inductive sensors, Foucault current sensors, laser sensors, inductive sensors and combinations thereof.

The computing unit is configured to perform a verification algorithm taking into account the distance measured by the sensor and a distance data entered by a user. In one embodiment of the invention, the verification algorithm compares the current distance data and the distance data entered and in case these do not match the computing unit sends the signal to the controller of the motor or motors (4A, 4B), which activates them. In case the current distance data and the entered distance data match the computation unit stops sending the signal to the motor(s) controller (4A, 4B).

In another embodiment of the invention, in case the current distance data and the entered distance data do not match and the current distance data is greater than the entered distance data, the computing unit sends counter-clockwise signal to the motor controllers (4A, 4B). Consequently, in case the current distance data and the current distance data do not match, but the current distance data is less than the distance data entered, the computing unit sends a clockwise signal to the motor controllers (4A, 4B).

In addition, the computing unit may be selected from the group comprising: microcontrollers (v.gr PSOC 4BLE), microprocessors, DSCs (Digital Signal Controllers), FPGAs (Field Programmable Gate Arrays), CPLDs (Complex Programmable Logic Devices), ASICs (Application Specific Integrated Circuits), SoCs (System on Chip), PSoCs (Programmable System on Chip), computers, servers, tablets, cell phones, mobile phones and other devices, PSoCs (Programmable System on Chip), computers, servers, tablets, cell phones, smart phones, signal generators and computing units, processing units or processing modules known to the average person skilled in the art and combinations thereof. In a particular example the computing unit is a microcontroller.

EXAMPLE

A realization of the opening and closing elements machine was designed, in this case the machine is a roller sheeter for the laminating of cookie dough, with which dough thicknesses of up to 0.3 mm are obtained.

Referring to FIGS. 6 and 7, the first element (14) and the second element (16) are connected to a first and a second support (8A, 8B) at their ends, wherein the first and the second elements (14, 16) are laminating rollers. Said laminating rollers are formed by a hollow cylinder which is connected to a pivot axis, said pivot axis passing through the hollow cylinder. The rotating shaft at its ends is connected with motors, which transmit rotation to the laminating rollers, so that the cookie dough may pass between the laminating rollers.

Referring further to FIGS. 6 and 7, the first element (14) which was a roller sheeter was connected by means of the ends of the pivot shaft to the second bore (10A) of a first support (8A) and to the second bore (10B) of a second support (8B). In this example, the pivot shaft at its ends was connected to the second bores (10A, 10B) by means of eccentric bushings (19A, 19B) which are arranged in ball bearings.

On the other hand, for the first and second mechanism (1A, 1B) we selected rods (7A, 7B) made of cast iron, the rods (7A, 7B) have two holes, one hole with diameter 121 mm and one hole with diameter 12.7 mm. The shafts (2A, 2B) are two 1" ACME threaded power screws made of AISI 4340 steel. On the other hand, each stem bolt has a clevis (5A, 5B), these devises (5A, 5B) have an internal thread at one end and orthogonal holes at one end that coincide with the holes of the rods (7A, 7B). The holes of the devises (5A, 5B) have a diameter of 12.7 mm, through these holes passed a pin to connect the clevis (5A, 5B) with the rods (7A, 7B). The pin has a diameter of 12.7 mm. At one end of the pin there is a slot, in which a locking ring or seeger ring is located, which retains the pin in the clevis.

In the case of the transmission mechanisms (3A, 3B), worm gears were selected which are housed in a case, where the power input of each transmission mechanism (3A, 3B) is connected to the power shafts (11A, 11B) and the power output of each transmission mechanism (3A, 3B) is connected to the power screw, which corresponds to the shafts (2A, 2B). Specifically, the transmission mechanisms (3A, 3B) are a REDUCER 2 Ton 25.1 Ratio 4" Rise (73-2).

Referring to FIGS. 6 and 7, the first and second mechanisms (1A, 1B) are supported on pivoting supports (13A, 13B), said pivoting supports (13A, 13B) having first holes (17A, 17B) and second holes (18A, 18B), the rotation axes of the first holes (17A, 17B) and of the second holes (18A, 18B) being orthogonal to each other. The first holes (17A, 17B) are longitudinal slots that allow rotation and displacement of the shafts (2A, 2B).

The pivoting supports (13A, 13B) were connected to the first and second couplings (12A, 12B) by means of coupling elements, which in this case are plates with holes. Fastening elements, which in this case are screws, are arranged in the holes of the plates and in the holes of the pivoting supports (13A, 13B) to connect the two elements. One of the plates with holes has one additional hole, in which screws were arranged with which the plate with holes is connected to the first end of the first and second couplings (12A, 12B), the other plate which is arranged at the second end was made to form a monolithic body with the first and second coupling (12A, 12B).

Referring to FIGS. 6 and 7, the first and second couplings (12A, 12B) are bushings, which, as mentioned above, at each end of the first and second couplings (12A, 12B) are located coupling elements, which are plates with holes. As explained above, the plate with holes at the first end of the first and second couplings (12A, 12B) is connected to the pivoting supports (13A, 13B). On the other hand, the plates with holes at the second end of the first and second couplings (12A, 12B) are connected to the transmission mechanisms (6A, 6B), which have holes in their case coinciding with the holes in the plates and where the fastening elements, which are screws, are arranged.

The transmission mechanisms (6A, 6B) which are gearboxes and are connected to the motors (4A, 4B) which are electric motors, the transmission mechanisms (6A, 6B) and the motors (4A, 4B) correspond to WAF20DRS71S4/DH R24.5 69 rpm460v/3 ph/60 hz 3HP SEW MOTORREDUCTOR WAF20DRS71S4/DH R24.5 69 rpm460v/3 ph/60 hz 3HP SEW. The motors (4A, 4B) have a controller that is connected to a computation unit, said computation unit was connected to a distance sensor, which determines the distance between the first element (14) and the second element (16). The computing unit controls the distance between the first and second elements (14), for which it was configured to send an electrical signal to the controller of the motors (4A, 4B) to turn it on, and to stop sending such signal when the computing unit detected that the first element (14) and the second element (16) were at a predetermined distance, in this case, the distance between the first and second elements (14, 16) was determined to be 0.21 mm.

The material selected to manufacture the pivoting supports (13A, 13B) is AISI 4140 steel, while the material selected to manufacture the first and second couplings (12A, 12B), the devises (5A, 5B), the pin and the plates with holes is M 238 brand steel.

With this configuration it was achieved that in operation of the element opening and closing machine, the elements of the first and second mechanisms (1A, 1B), the transmission mechanisms (6A, 6B) and the motors (4A, 4B) rotate between 75° and 110°, since they are not connected to any fixed element, but on the contrary, they were connected to the first and second coupling (12A, 12B), which may rotate in the first perforations (9A, 9B).

Tests were made for 6 months, where the shafts (2A, 2B) remained functional and no changes were needed, the result is relevant considering that in other conventional laminating machines, where the system that moves the mobile roller is connected directly to the chassis of the machine, the power screws cannot rotate. Therefore, in these conventional machines, the power screws must be changed approximately every 2 months, since the power screws could not rotate, causing failures due to buckling of the power screws.

Additionally, it should be noted that the above configuration allows to move the first element (14) at millimeter distances between 0.21 mm and 7, thus allowing to obtain a cookie dough of approximately 0.3 mm thickness.

It shall be understood that this invention is not limited to the embodiments described and illustrated, for as will be evident to a person skilled in the art, there are variations and modifications possible which do not depart from the spirit of the invention, defined by the following claims.

The invention claimed is:

1. A machine for opening and closing elements comprising:
    a first element facing a second element
    a first support having a first perforation;
    a power shaft;
    a first mechanism comprising:
        a shaft having a first end and a second opposite end;
        a transmission mechanism connected to the power shaft and to the first end of the shaft; wherein, the transmission mechanism allows transforming the rotation of the power shaft into linear motion that is transmitted to the shaft; and
        a rod connected to the second opposite end of the shaft and to the first element wherein the rod motion to the first element, comprising:
    a first coupling having a first end, a second end and a through hole, the first coupling being arranged concentrically in the first perforation of the first support;
    wherein, the power shaft is located within the through hole;
    wherein the first mechanism is connected to the second end of the first coupling; and
    wherein the first mechanism is configured to rotate around the first perforation of the first support, and this in turn transmits rotation to the first coupling.

2. The device according to claim 1, wherein the first element and the second element are rollers.

3. The device according to claim 1, wherein the first mechanism is connected to the second end of the first coupling via a pivoting support having a first hole and a second hole, said second hole being disposed collinear to the first perforation of the first support; wherein, the shaft is located in the first hole of the pivoting support and the transmission mechanism is arranged in the pivoting support.

4. The device according to claim 3, wherein the rotation axes of the first hole and second hole of the pivoting support are orthogonal to each other.

5. The device according to claim 1, wherein the power shaft is connected to a motor, said motor being disposed in turn to the first end of the coupling and configured to rotate around the first perforation.

6. The device according to claim 5, wherein the first coupling at the first and second ends has a plate with holes, wherein in the holes are arranged fasteners allowing connection of the motor and the first end of the first coupling, and of the first mechanism with the second end of the first coupling.

7. The device according to claim 1, wherein the first element is connected to an eccentric bushing at one end of the first element, said eccentric bushing being disposed in a second bore of the first support.

8. The device according to claim 1, wherein the transmission mechanism is a worm gear that is connected to the shaft, which corresponds to a power screw.

9. The device according to claim 1, wherein the rod and the shaft are connected by means of a clevis.

10. The device according to claim 1, wherein the first mechanism rotates in a range between 75° and 110°.

11. The device according to claim 1, having a second support with a first perforation; a power shaft; a second mechanism comprising: a shaft with a first end and a second opposite end; a transmission mechanism connected to the power shaft and to the first end of the shaft; wherein, the transmission mechanism allows transforming the rotation of the power shaft into linear motion that is transmitted to the shaft; and a rod connected to the second opposite end of the shaft and to the first element, wherein the rod transmits motion to the first element, further comprising:
    a second coupling with having a first end, a second end and a through hole, the second coupling being arranged concentrically in the first perforation B of the second support,
    wherein, the power shaft is located within the through hole;
    wherein the second mechanism is connected to the second end of the coupling; and
    wherein the first mechanism is configured to rotate around the first perforation of the second support, and this in turn transmits rotation to the second coupling.

12. The device according to claim 11, wherein the first element and the second element are rollers.

13. The device according to claim 11, the second mechanism is connected to the second end of the second coupling via a pivoting support having a first hole and a second hole, said second hole being disposed collinearly to the first perforation of the second support; wherein, the shaft is located in the first hole of the pivoting support and the transmission mechanism is disposed in the pivoting support.

14. The device according to claim 13, wherein the rotation axes of the first hole and second hole of the pivoting support are orthogonal to each other.

15. The device according to claim 11, wherein the power shaft is connected to a motor, said motor in turn being connected to the first coupling end and configured to rotate around the first perforation.

16. The device according to claim 15, wherein the coupling at the first and second end has a plate with holes, in said holes are arranged fasteners allowing connection of the motor and the first end of the first coupling, and of the second mechanism with the second end of the first coupling.

17. The device according to claim 11, wherein the first element is connected to an eccentric bushing at one end of the first element, said eccentric bushing being disposed in a second bore of the second support which is collinear with the second bore of the first support.

18. The device according to claim 11, wherein the transmission mechanism is a gear that is connected to the shaft, corresponding to a worm gear.

19. The device according to claim 11, wherein the rod and the shaft is connected by means of a clevis.

20. The device according to claim 11, wherein the second mechanism rotates in a range between 75° and 110°.

* * * * *